(12) United States Patent
Lin et al.

(10) Patent No.: US 8,498,240 B2
(45) Date of Patent: Jul. 30, 2013

(54) RESYNCHRONIZATION METHOD FOR RECOVERING FROM SLEEP MODE AND APPARATUSES USING THE SAME

(75) Inventors: Jia-Ching Lin, Hsinchu (TW); Yi-Jung Chiang, Kaohsiung (TW); Ming-Chi Chen, Danshuei Township, Taipei County (TW); To-Ping Wang, Banciao (TW)

(73) Assignee: Mediatek Inc., Hsin-Chu (TW)

( * ) Notice: Subject to any disclaimer, the term of this patent is extended or adjusted under 35 U.S.C. 154(b) by 303 days.

(21) Appl. No.: 12/944,138

(22) Filed: Nov. 11, 2010

(65) Prior Publication Data

US 2012/0120993 A1    May 17, 2012

(51) Int. Cl.
*H04B 7/212* (2006.01)
*H04J 3/06* (2006.01)

(52) U.S. Cl.
CPC ............ *H04B 7/2126* (2013.01); *H04J 3/0685* (2013.01)
USPC ....................... 370/324; 370/395.62; 370/503

(58) Field of Classification Search
None
See application file for complete search history.

(56) References Cited

U.S. PATENT DOCUMENTS

| | | | | |
|---|---|---|---|---|
| 6,111,927 A * | 8/2000 | Sokoler | ......................... | 375/365 |
| 6,212,398 B1 * | 4/2001 | Roberts et al. | ................. | 455/502 |
| 6,603,979 B1 * | 8/2003 | Hirsch | ........................... | 455/502 |
| 6,735,454 B1 * | 5/2004 | Yu et al. | ........................ | 455/574 |
| 7,236,810 B1 * | 6/2007 | Underbrink et al. | ........... | 455/574 |
| 7,403,507 B2 * | 7/2008 | McDonough et al. | ......... | 370/335 |
| 7,983,115 B2 * | 7/2011 | Ianni et al. | ....................... | 368/46 |
| 2003/0148800 A1 * | 8/2003 | Lee | ................. | 455/574 |
| 2004/0017777 A1 * | 1/2004 | Chaudhuri et al. | ............ | 370/241 |
| 2004/0067742 A1 * | 4/2004 | Ormson | ......................... | 455/258 |
| 2004/0101077 A1 * | 5/2004 | Miller et al. | ................... | 375/354 |
| 2008/0118014 A1 * | 5/2008 | Reunamaki et al. | ........... | 375/356 |
| 2010/0124240 A1 * | 5/2010 | Lu et al. | ......................... | 370/503 |

* cited by examiner

*Primary Examiner* — Ayaz Sheikh
*Assistant Examiner* — Peter Chau
(74) *Attorney, Agent, or Firm* — McClure, Qualey & Rodack, LLP

(57) ABSTRACT

A wireless communications device connected to a service network with a synchronized timing pattern therebetween is provided. In the wireless communications device, a wireless modem is configured to enable wireless signal transceiving from and to the service network in a non-sleep mode and disable wireless signal transceiving from and to the service network in a sleep mode. Also in the wireless communications device, a synchronization module is configured to initialize a first counter with a current time in the synchronized timing pattern in response to a first signal triggering the wireless modem to enter the sleep mode from the non-sleep mode, and enable counting of the first counter in a low-rate clock for the sleep mode. The synchronization module further provides the counted value of the first counter to the wireless modem to resynchronize with the service network in response to a second signal triggering the wireless modem to recover from the sleep mode to the non-sleep mode.

15 Claims, 5 Drawing Sheets

RESYNCHRONIZATION METHOD FOR RECOVERING FROM SLEEP MODE AND APPARATUSES USING THE SAME

BACKGROUND OF THE INVENTION

1. Field of the Invention

The invention relates generally to synchronization techniques for wireless communications, and more particularly, to resynchronization when recovering from a sleep mode for wireless communications.

2. Description of the Related Art

When a mobile device is powered on and trying to connect to a service network, it first synchronizes with the service network by aligning its system timing with the timing pattern of the service network before establishing wireless communication connection with the service network. Take the Global System for Mobile Communications (GSM) for example. When powered on, a mobile station (MS) detects a cell in the GSM service network with the best received signal strength in the area and then searches for the synchronization channel (SCH) of the cell. The MS may obtain the timing pattern of the cell by identifying the frame boundary and slot boundary on the SCH of the cell. Subsequently, the MS may align its system timing with the timing pattern of the cell to synchronize with the cell, and accordingly obtain wireless communication services from the GSM service network if necessary. Generally, a wireless modem in the MS may maintain a modem counter with the obtained timing pattern of the cell. After successfully camping on the cell, the MS may be configured to enter a sleep mode if there's no potential operation for wireless communications in a forthcoming period of time. The MS only needs to wake up from the sleep mode every known paging cycle to check if there's a dedicated paging request or an update of the system information broadcasts. For an MS operating in the sleep mode, the wireless modem therein is shut down, and the processing unit therein, such as a central processing unit (CPU) or a micro control unit (MCU), switches from a high-rate clock to a low-rate clock to save on the consumed power. Since the wireless modem is shut down in the sleep mode, the modem counter is stopped and does not keep track of the timing pattern of the cell. Thus, resynchronization with the cell is necessary for the MS to align its system timing with the timing pattern of the cell when recovering from the sleep mode.

FIG. 1 is a timing diagram illustrating the resynchronization for an MS recovering from the sleep mode. As shown in FIG. 1, the system timing of the MS is aligned with the timing pattern of the base station (BS). At time t1, the MS determines that no potential operation for wireless communications is expected in a forthcoming period of time, and issues a trigger signal to indicate that the wireless modem can enter the sleep mode for N seconds. After the trigger signal is issued, a short period of time (i.e. the time interval between t1 and t2) is occupied by the software and hardware modules of the MS to prepare to switch to the sleep mode from the non-sleep mode. At time t2, the MS officially enters the sleep mode in which only a low-rate clock is running to sustain the basic functions of the MS, and the timing pattern of the BS is not count in the sleep mode. It is noted that, although the predetermined N seconds has not yet passed, the MS needs to wake up in advance from the sleep mode at time t3, to perform calculation of the current time in the timing pattern of the BS, so that the MS may smoothly resynchronize with the BS at exactly N seconds after time t2. Specifically, the resynchronization calculation includes division operations which consume time and power and require the CPU to run at a full speed. As a result, the early waking-up of the MS consumes extra system power for the resynchronization calculation for timing resume.

BRIEF SUMMARY OF THE INVENTION

In light of the previously described problems, there exists a need for an apparatus and method, in which resynchronization in recovering from a sleep mode may be efficiently performed to save power.

One aspect of the invention discloses a wireless communications device connected to a service network with a synchronized timing pattern therebetween. The wireless communications device comprises a wireless modem and a synchronization module. The wireless modem is configured to enable wireless signal transceiving from and to the service network in a non-sleep mode and disable wireless signal transceiving from and to the service network in a sleep mode. The synchronization module is configured to initialize a first counter with a current time in the synchronized timing pattern in response to a first signal triggering the wireless modem to enter the sleep mode from the non-sleep mode, and enable counting of the first counter in a low-rate clock for the sleep mode. Also, the synchronization module provides the counted value of the first counter to the wireless modem to resynchronize with the service network in response to a second signal triggering the wireless modem to recover from the sleep mode to the non-sleep mode.

Another aspect of the invention discloses a resynchronization method for recovering from a sleep mode in a wireless communications device. The method comprises the steps of: connecting to a service network with a synchronized timing pattern therebetween, initializing a first counter with a current time in the synchronized timing pattern in response to entering the sleep mode from a non-sleep mode, enabling counting of the first counter in a low-rate clock for the sleep mode, and directly using the counted value of the first counter to resynchronize with the service network in response to recovering from the sleep mode to the non-sleep mode.

Other aspects and features of the invention will become apparent to those with ordinary skill in the art upon review of the following descriptions of specific embodiments of the wireless communications devices and resynchronization methods for recovering from a sleep mode.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
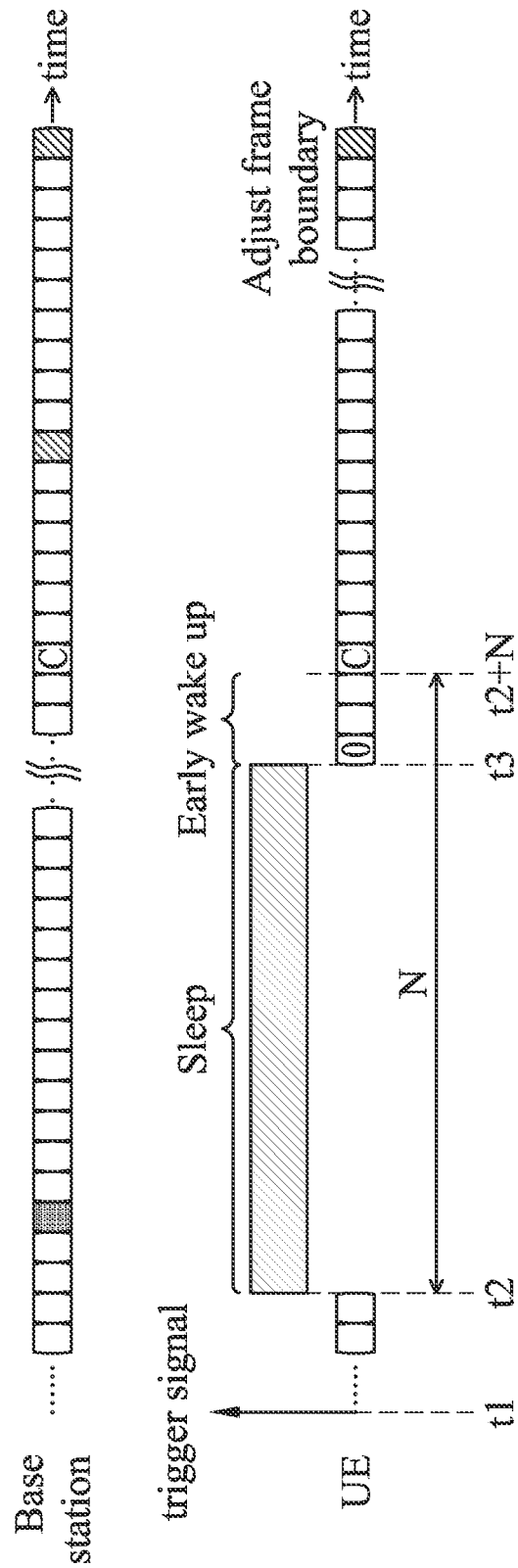
FIG. 1 is a timing diagram illustrating the resynchronization for an MS recovering from the sleep mode.
Figure 2:
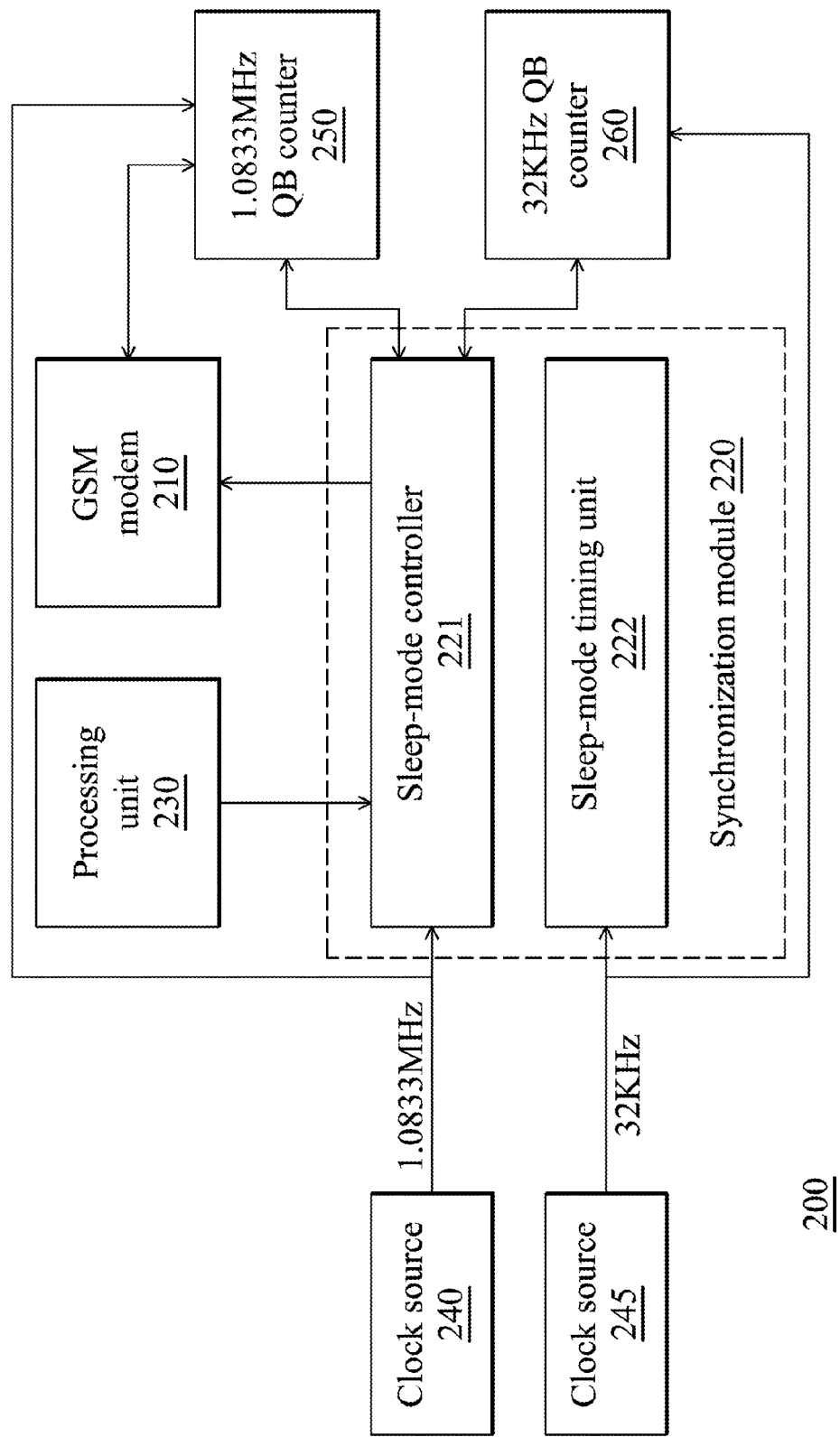
FIG. 2 is a block diagram illustrating a wireless communications device according to an embodiment of the invention.
Figure 3:
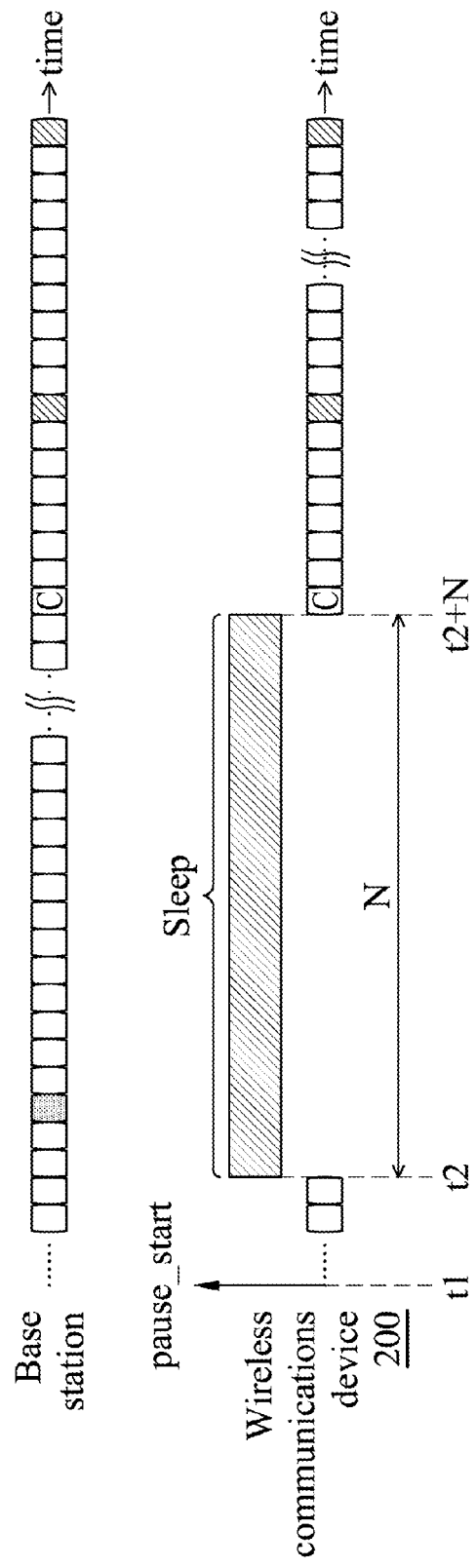
FIG. 3 is a timing diagram illustrating the resynchronization for recovering from the sleep mode according to the embodiment of FIG. 2.

FIG. 2 is a block diagram illustrating a wireless communications device according to an embodiment of the invention. When powered on, the wireless communications device 200 is configured to connect to a GSM network via an air interface for obtaining wireless communication services. Specifically, the wireless communications device 200 has to synchronize with the GSM network according to the timing pattern of the GSM network. In general, the timing pattern of a GSM system may comprise a plurality of continuous frames, and each frame may be further divided into 5000 quarter-bits (QB) as the basic timing units. Each frame in the timing pattern has a duration of 4.615 milliseconds and each QB has a duration of 0.000923 milliseconds. The wireless communications device 200 comprises a GSM modem 210, a synchronization module 220, a processing unit 230, clock sources 240 and 245, a 1.0833 MHz QB counter 250, and a 32 KHz QB counter 260. The GSM modem 210 may enable wireless signal transceiving from and to the GSM network in the non-sleep mode, and disable wireless signal transceiving from and to the GSM network in the sleep mode. The clock sources 240 and 245 respectively generate a 1.0833 MHz clock and a 32 KHz clock for the non-sleep mode and sleep mode. Note that the wireless signal transceiving from and to the GSM network is performed according to the timing pattern of the GSM network, wherein the current time of the timing pattern is maintained in the 1.0833 MHz QB counter 250. The 1.0833 MHz QB counter 250 operates according to the clock rate for the non-sleep mode, i.e. 1.0833 MHz, and when enabled to count, the value maintained therein is incremented by 1 for each QB duration. FIG. 3 is a timing diagram illustrating the resynchronization for recovering from the sleep mode according to the embodiment of FIG. 2. When it is determined at time T1 that there is no potential operation for wireless communications in a forthcoming period of time, the processing unit 230 issues a "pause_start" signal to indicate that the wireless communications device 200 is about to enter the sleep mode for a predetermined period of time N. The predetermined period of time N may be indicated in the system information broadcasts received from the GSM system in the early phase of camping on to a specific cell of the GSM system. For example, the predetermined period of time N may be configured to 0.5~2 seconds in a GSM system. The processing unit 230 may be a general-purpose processor, an MCU, or others, which loads and executes a series of program codes from a memory unit (not shown) or storage device (not shown) to provide control of other functional modules in the wireless communications device 200. After the "pause_start" signal is issued, a short period of time (denoted as the time interval between T1 and T2) is taken for other software and hardware modules of the wireless communications device 200 to save their current statuses and switch to idle states.

At time T2, after ensuring that the software and hardware modules of the wireless communications device 200 have all switched to the idle states, the processing unit 230 further requests the synchronization module 220 to prepare for entering the sleep mode. The synchronization module 220 further comprises a sleep-mode controller 221 and a sleep-mode timing unit 222, wherein the sleep-mode controller 221 handles the operations regarding the switching between the non-sleep mode and sleep mode, and the sleep-mode timing unit 222 handles the timing in the sleep mode. Specifically, at time T2, the sleep-mode controller 221 retrieves the value of the 1.0833 MHz QB counter 250, i.e. the current time of the timing pattern of the GSM network, and initializes the 32 KHz QB counter 260 with the value of the 1.0833 MHz QB counter 250. The sleep-mode controller 221 further enables the counting of the 32 KHz QB counter 260, and requests the sleep-mode timing unit 222 to count the predetermined period of time N. Meanwhile, the sleep-mode controller 221 also requests the GSM modem 210 to enter the sleep mode from the non-sleep mode, in which the GSM modem 210 disables the wireless signal transceiving from and to the GSM network. The 32 KHz QB counter 260 operates according to the clock rate running in the sleep mode, i.e. 32 KHz, and the value maintained therein is incremented by TF for each tick of the 32 KHz clock, wherein TF indicates the number of QBs included in an interval between two successive ticks of the 32 KHz clock. To request the sleep-mode timing unit 222 to count the predetermined period of time N, the sleep-mode controller 221 may indicate the information concerning a starting time and a duration of the sleep mode to the sleep-mode timing unit 222. In one embodiment, the sleep-mode timing unit 222 may further comprise a 32 KHz clock counter (not shown) for counting the ticks of the 32 KHz clock. When receiving the request from the sleep-mode controller 221, the sleep-mode timing unit 222 starts to count the predetermined period of time N according to the 32 KHz clock. Later, when the predetermined period of time N is elapsed at time T2+N, the sleep-mode timing unit 222 issues a "time_up" signal to the sleep-mode controller 221 indicating that the requested duration of the sleep mode has been reached. In response to the "time_up" signal, the sleep-mode controller 221 stores the value of the 32 KHz QB counter 260 into the 1.0833 MHz QB counter 250 to reinitialize the 1.0833 MHz QB counter 250, and then requests the GSM modem 210 to recover from the sleep mode. Accordingly, the GSM modem 210 enters from the sleep mode to the non-sleep mode using the value of the 1.0833 MHz QB counter 250, to resynchronize with the GSM network. After that, the sleep-mode controller 221 may disable counting of the 32 KHz QB counter 260, and the sleep-mode timing unit 222 may be configured to switch to an idle state after issuing the "time_up" signal. There is no resynchronization calculation required for recovering from the sleep mode, so that the wireless communications device 200 may remain in the sleep mode for the entire predetermined period of time N to reduce additional power consumed for resynchronization calculation. It is to be understood that the sleep-mode controller 221 and the sleep-mode timing unit 222 may be incorporated into a single unit in the synchronization module 220.

In another embodiment, the 1.0833 MHz QB counter 250 and the 32 KHz QB counter 260 may be incorporated into one single QB counter (not shown), and the wireless communications device 200 may further comprise a clock switching device (not shown) coupled to the single QB counter. Specifically, the clock switching device (not shown) receives the 1.0833 MHz clock and the 32 KHz clock from the clock sources 240 and 245, respectively, and is controlled by the sleep-mode controller 221 to direct one of the 1.0833 MHz clock and the 32 KHz clock to the single QB counter (not shown), so that the single QB counter (not shown) operates and counts according to the input clock rate. That is, the sleep-mode controller 221 controls the clock switching device (not shown) to direct the 1.0833 MHz clock to the single QB counter (not shown) for the non-sleep mode, and to direct the 32 KHz clock to the single QB counter (not shown) for the sleep mode. When first receiving an input clock rate of 1.0833 MHz clock for the non-sleep mode, the single QB counter (not shown) starts counting from zero to be incremented by 1 for each QB duration according to the 1.0833

MHz clock. Subsequently, from the currently counted value, the single QB counter (not shown) switches the counting to be incremented by TF for each tick of the 32 KHz clock, when the input clock rate switches from the 1.0833 MHz clock to the 32 KHz clock for the sleep mode. After that, when the input clock rate switches back from the 32 KHz clock to the 1.0833 MHz clock for the non-sleep mode, the single QB counter (not shown) switches the counting to be incremented by 1 for each QB duration according to the 1.0833 MHz clock again, from the latest counted value. In yet another embodiment, the 1.0833 MHz QB counter 250 and the 32 KHz QB counter 260 may be incorporated into one single QB counter (not shown), and the sleep-mode controller 221 directly controls the single QB counter (not shown) to operate and count according to which one of the 1.0833 MHz clock and the 32 KHz clock. When configured to operate and count according to the 1.0833 MHz clock, the single QB counter (not shown) starts counting to be incremented by 1 for each QB duration according to the 1.0833 MHz clock. When configured to operate and count according to the 32 KHz clock, the single QB counter (not shown) switches the counting to be incremented by TF for each tick of the 32 KHz clock.

Figure 4:
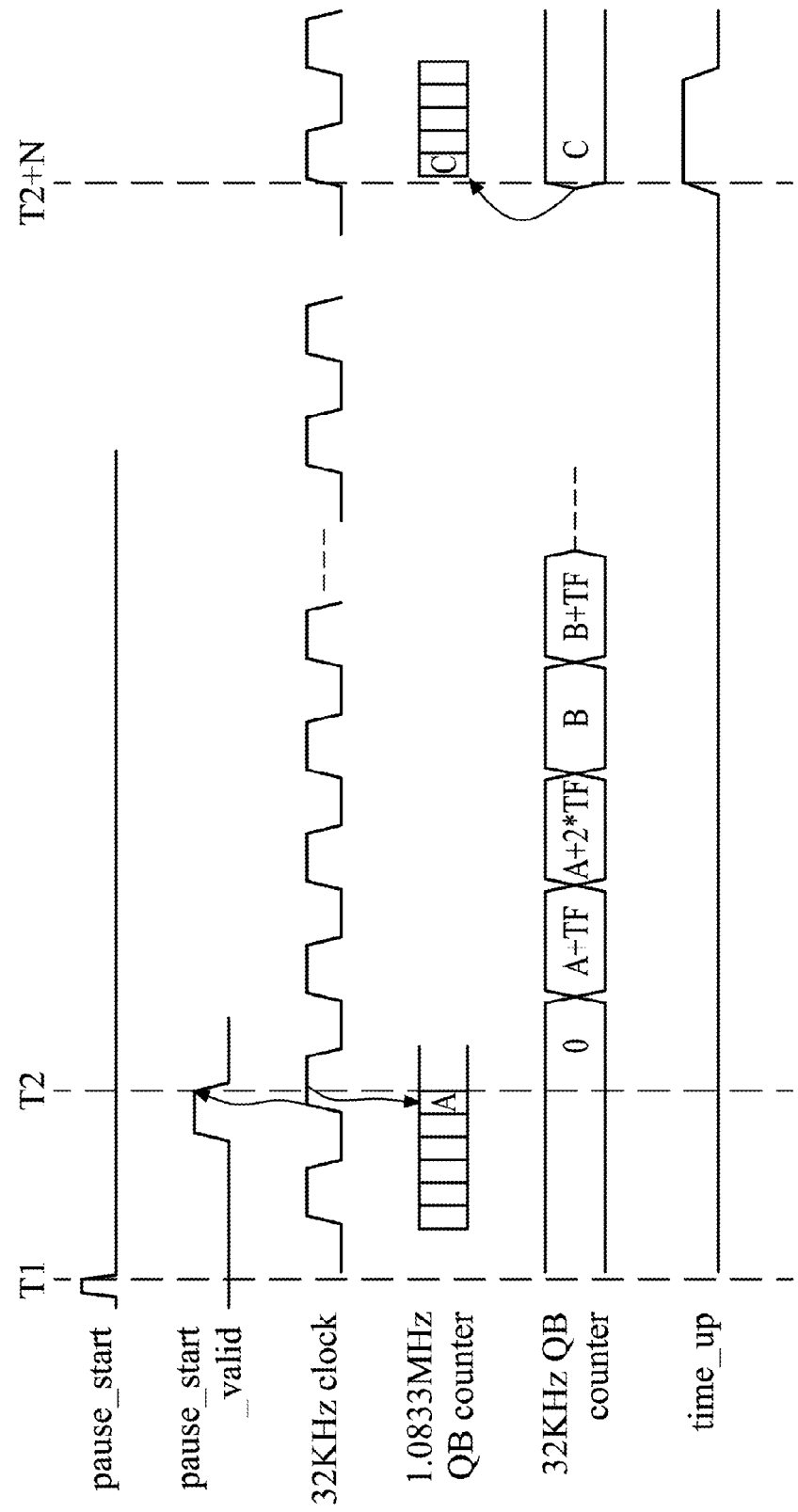
FIG. 4 is a diagram illustrating the detailed operations of switching between the non-sleep mode and sleep mode with respect to the timing diagram of FIG. 3 according to an embodiment of the invention.

Note that, the non-sleep mode may refer to the stand-by mode or connected mode based on the specifications or requirements of the supported version of the GSM technology in the wireless communications device 200. In addition, in the 32 KHz QB counter 260, the counted value is reset to zero when a frame boundary is reached. That is, when the counted value exceeds 5000, a wrap-up operation may be performed to keep the value in QB units within a frame. One way to implement the warp-up operation may be to subtract the counted value by 5000. FIG. 4 is a diagram illustrating the detailed operations of switching between the non-sleep mode and sleep mode with respect to the timing diagram of FIG. 3 according to an embodiment of the invention. At time T1, it is determined that no potential operation for wireless communications is expected in a forthcoming period of time, and the processing unit 230 issues a "pause_start" signal requesting other software and hardware modules of the wireless communications device 200 to save their current statuses and switch to idle states. At time T2, after ensuring that the software and hardware modules of the wireless communications device 200 have all switched to idle states, the processing unit 230 further issues a "pause_start_valid" signal to the sleep-mode controller 221 indicating that the wireless communications device 200 is going to enter the sleep mode for a predetermined period of time N. When receiving the "pause_start_valid" signal, the sleep-mode controller 221 first requests the GSM modem 210 to disable wireless transceiving from and to the GSM network, and disables counting of the 1.0833 MHz QB counter 250. Then, the sleep-mode controller 221 further requests the sleep-mode timing unit 222 to count the predetermined period of time N, and enables counting of the 32 KHz QB counter 260 from zero. Specifically, the sleep-mode controller 221 uses the value of the 1.0833 MHz QB counter 250, denoted as A, to initialize the 32 KHz QB counter 260 to start counting from A. With each tick of the 32 KHZ clock, the value of the 32 KHz QB counter 260 is incremented by TF. Assume that, at the third tick of the 32 KHZ clock after the 32 KHz QB counter 260 is initialized, the value of the 32 KHz QB counter 260 exceeds a frame boundary (i.e. A+3TF>5000). Therefore, a wrap-up operation is performed to keep the value of the 32 KHz QB counter 260 in QB units within a frame, by subtracting the value of the 32 KHz QB counter 260 by 5000. The wrapped-up value of the 32 KHz QB counter 260 is denoted as B=A+3TF−5000, as shown in FIG. 3. Later, at time T2+N, the sleep-mode timing unit 222 issues a "time_up" signal to the sleep-mode controller 221 informing that the predetermined period of time N has elapsed. When receiving the "time_up" signal, the sleep-mode controller 221 saves the current value of the 32 KHz QB counter 260, denoted as C, to the 1.0833 MHz QB counter 250, and enables the counting of the 1.0833 MHz QB counter 250. Also, at this time, the sleep-mode controller 221 requests the GSM modem 210 to recover from the sleep mode to resynchronize with the GSM network using the value of the 1.0833 MHz QB counter 250.

Figure 5:
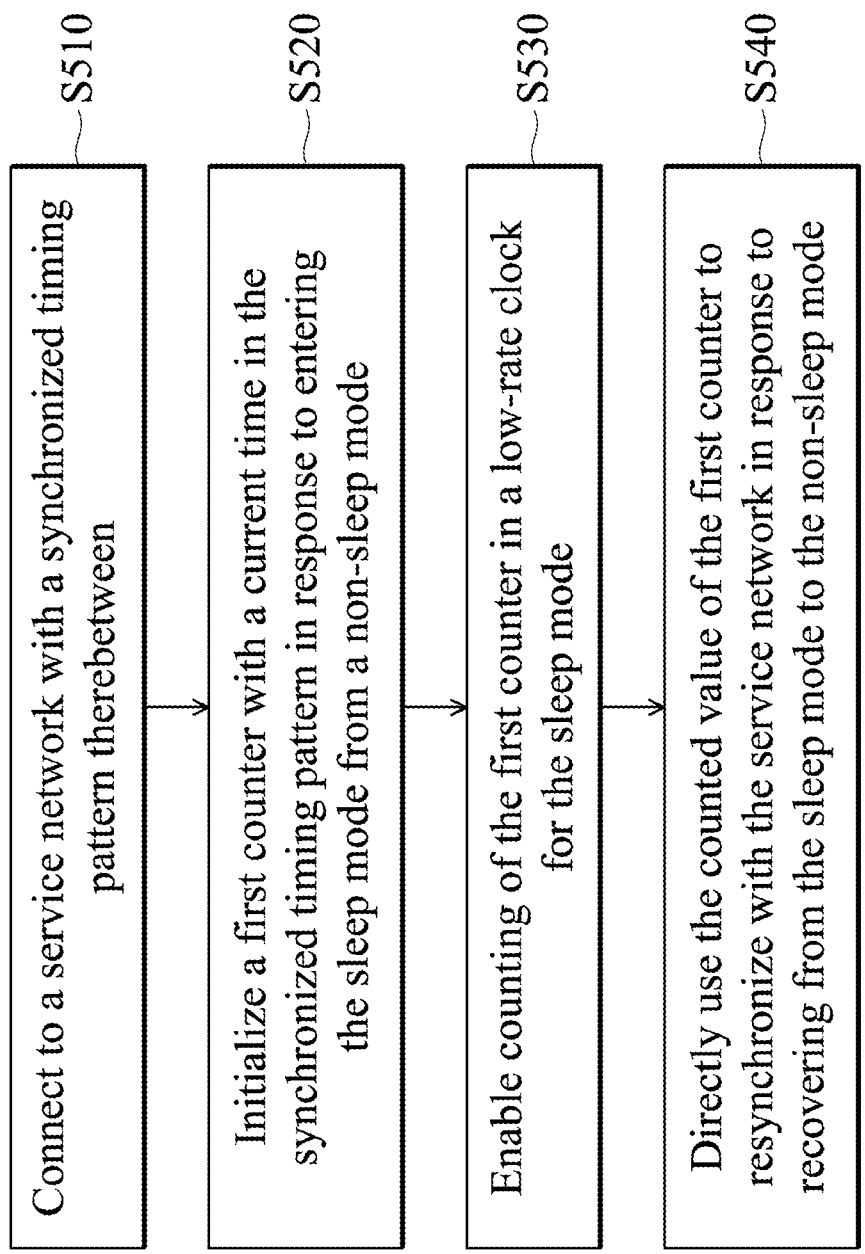
FIG. 5 is a flow chart of the resynchronization method according to an embodiment of the invention.

FIG. 5 is a flow chart of the resynchronization method according to an embodiment of the invention. The resynchronization method may be applied to a wireless communications device recovering from the sleep mode to resynchronize with a connected service network. Specifically, the resynchronization method aims to reduce the power consumption for timing recovery from the sleep mode. Take a GSM environment comprising the wireless communications device 200 and a GSM network for example. To begin, the wireless communications device 200 first connects to a service network with a synchronized timing pattern therebetween (step S510), wherein the synchronized timing pattern is maintained in the 1.0833 MHz QB counter 250. The 1.0833 MHz QB counter 250 operates according to the clock rate for the non-sleep mode, i.e. 1.0833 MHz, and when enabled to count, the value maintained therein is incremented by 1 for each QB duration. After successfully connecting to the service network, the wireless communications device 200 enters the non-sleep mode for performing wireless transceiving from and to the service network. Subsequently, when it is determined that there is no potential operation for wireless communications in a forthcoming period of time, the wireless communications device 200 initializes the 32 KHz QB counter 260 with the current time in the synchronized timing pattern upon entering the sleep mode (step S520). To enter the sleep mode, the counting of the 1.0833 MHz QB counter 250 is disabled. The 32 KHz QB counter 260 operates according to the clock rate running in the sleep mode, i.e. 32 KHz, and the value maintained therein is incremented by TF for each tick of the 32 KHz clock, wherein TF indicates the number of QBs included in an interval between two successive ticks of the 32 KHz clock. Subsequently, the wireless communications device 200 enables counting of the 32 KHz QB counter 260 in the 32 KHz clock for a predetermined period of time (step S530). Specifically, during counting of the 32 KHz QB counter 260, a warp-up operation is performed to keep the value in QB units within a frame when the value of the 32 KHz QB counter 260 exceeds a frame boundary. Later, when the predetermined period of time is elapsed, the wireless communications device 200 directly uses the counted value of the 32 KHz QB counter 260 to resynchronize with the service network upon recovering from the sleep mode (step S540). To recover from the sleep mode, the value of the 32 KHz QB counter 260 is saved back to the 1.0833 MHz QB counter 250 to enable the counting of the 1.0833 MHz QB counter 250, and the counting of the 32 KHz QB counter 260 is disabled. Alternatively, the 1.0833 MHz QB counter 250 and the 32 KHz QB counter 260 may be incorporated into one single QB counter (not shown), and the single QB counter (not shown) may be configured to perform the counting in the non-sleep mode and the sleep mode as described above without having to saving back the counted value between the 1.0833 MHz QB counter 250 and the 32 KHz QB counter 260. Specifically, the counting operation of the single QB counter (not shown) may be controlled by a clock switching device (not shown) for directing one of the 1.0833 MHz clock and the 32 KHz clock to the single QB counter (not shown), or controlled by the sleep-mode controller 221 directly. Note that no resynchronization calculation is required upon recovering from the sleep mode, and the wireless communications device 200 may remain in the sleep mode for the entire predetermined period of time to reduce power consumption.

It is to be understood that the GSM modem 210 is only given as an exemplary wireless communication technology used by the wireless communications device 200, and the invention can not be limited thereto. The wireless communications device 200 may support other wireless communication technology, such as Wideband Code Division Multiple Access (WCDMA), Long Term Evolution (LTE), Worldwide Interoperability for Microwave Access (WiMAX), or others, and the GSM modem 210 may be replaced with a corresponding modem for the supported wireless communication technology, such as a WCDMA modem, LTE modem, or WiMAX modem, except that the detailed operations of entering and recovering from the sleep mode in different wireless communication technology may vary. Reference regarding the detailed operations of entering and recovering from the sleep mode may be made to the specification of the supported wireless communication technology. In addition, the wireless communications device 200 may comprise multiple wireless modems respectively supporting different wireless communication technologies, such as WCDMA, LTE, WiMAX, and other technologies. In one embodiment, the wireless communications device 200 may further comprise multiple sleep-mode timing units respectively corresponding to the above mentioned wireless modems, and each of the sleep-mode timing units may be configured to count a respective period of time specified for the sleep mode of the corresponding wireless communication technology. In such as a multi-system wireless communications device, a respective set of a 1.0833 MHz QB counter and a 32 KHz QB counter may be assigned to each wireless communication technology.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A wireless communications device connected to a service network with a synchronized timing pattern therebetween, comprising:
    a wireless modem configured to enable wireless signal transceiving from and to the service network in a non-sleep mode and disable wireless signal transceiving from and to the service network in a sleep mode; and
    a synchronization module configured to initialize a first counter with a current time in the synchronized timing pattern in response to a first signal triggering the wireless modem to enter the sleep mode from the non-sleep mode, enable counting of the first counter in a low-rate clock for the sleep mode, and provide the counted value of the first counter to the wireless modem to resynchronize with the service network in response to a second signal triggering the wireless modem to recover from the sleep mode to the non-sleep mode,
    wherein the current time in the synchronized timing pattern is maintained by a second counter counting in a high-rate clock for the non-sleep mode, and the second counter is reinitialized with the counted value of the first counter when the wireless modem recovers from the sleep mode to the non-sleep mode.

2. The wireless communications device as claimed in claim 1, further comprising a clock source generating the low-rate clock for the sleep mode and the high-rate clock for the non-sleep mode.

3. The wireless communications device as claimed in claim 1, wherein the low-rate clock for the sleep mode is a 32 kilohertz (KHz) clock and the high-rate clock for the non-sleep mode is a 1.0833 megahertz (MHz) clock.

4. The wireless communications device as claimed in claim 1, wherein the first counter is further coupled to a clock switching device for switching the counting of the first counter from the low-rate clock to a high-rate clock for the non-sleep mode when the wireless modem recovers from the sleep mode to the non-sleep mode.

5. The wireless communications device as claimed in claim 4, further comprising a clock source generating the low-rate clock for the sleep mode and the high-rate clock for the non-sleep mode.

6. The wireless communications device as claimed in claim 4, wherein the low-rate clock for the sleep mode is a 32 kilohertz (KHz) clock and the high-rate clock for the non-sleep mode is a 1.0833 megahertz (MHz) clock.

7. The wireless communications device as claimed in claim 1, wherein the first counter is reset to zero in response to the counted value of the first counter exceeding a frame boundary in the synchronized timing pattern.

8. The wireless communications device as claimed in claim 1, wherein the wireless modem is configured to enter the sleep mode from the non-sleep mode for a period of time indicated in system information received from the service network, and recover from the sleep mode to the non-sleep mode according to the system information.

9. A resynchronization method for recovering from a sleep mode in a wireless communications device, comprising:
    connecting to a service network with a synchronized timing pattern therebetween;
    initializing a first counter with a current time in the synchronized timing pattern in response to entering the sleep mode from a non-sleep mode, wherein the current time in the synchronized timing pattern is maintained by a second counter counting in a high-rate clock for the non-sleep mode;
    enabling counting of the first counter in a low-rate clock for the sleep mode;
    directly using the counted value of the first counter to resynchronize with the service network in response to recovering from the sleep mode to the non-sleep mode; and
    reinitializing the second counter with the counted value of the first counter in response to recovering from the sleep mode to the non-sleep mode.

10. The resynchronization method as claimed in claim 9, wherein a wireless signal transceiving from and to the service network is enabled in the non-sleep mode and disabled in the sleep mode.

11. The resynchronization method as claimed in claim 9, wherein the low-rate clock for the sleep mode is a 32 kilohertz (KHz) clock and the high-rate clock for the non-sleep mode is a 1.0833 megahertz (MHz) clock.

12. The resynchronization method as claimed in claim 9, further comprising switching the counting of the first counter from the low-rate clock to a high-rate clock for the non-sleep mode in response to recovering from the sleep mode to the non-sleep mode.

13. The resynchronization method as claimed in claim 12, wherein the low-rate clock for the sleep mode is a 32 kilohertz (KHz) clock and the high-rate clock for the non-sleep mode is a 1.0833 megahertz (MHz) clock.

14. The resynchronization method as claimed in claim 9, further comprising resetting the first counter to zero in response to the counted value of the first counter exceeding a frame boundary in the synchronized timing pattern.

15. The resynchronization method as claimed in claim 9, further comprising entering the sleep mode from the non-sleep mode for a period of time indicated in system information received from the service network, and recovering from the sleep mode to the non-sleep mode according to the system information.

\* \* \* \* \*